W. N. Gesner,
Windlass Attachment.
Nº 13,429.          Patented Aug. 14, 1855.

UNITED STATES PATENT OFFICE.

W. N. GESNER, OF FAIR HAVEN, CONNECTICUT.

WINDLASS.

Specification of Letters Patent No. 13,429, dated August 14, 1855.

*To all whom it may concern:*

Be it known that I, W. N. GESNER, of Fair Haven, in the county of New Haven and State of Connecticut, have invented a new and useful Guide-Pulley Attachment to be Applied to Windlasses; and I do hereby declare that the following is a full, clear, and exact description of the same, reference being had to the annexed drawings, making a part of this specification, in which—

Figure 1:
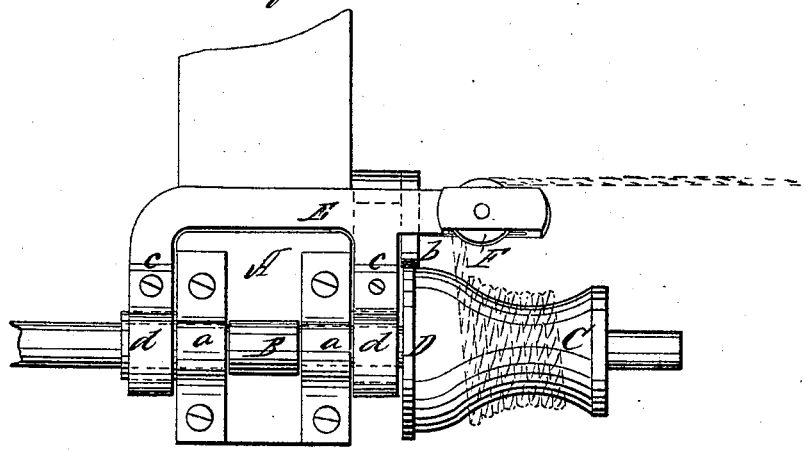
Figure 2:
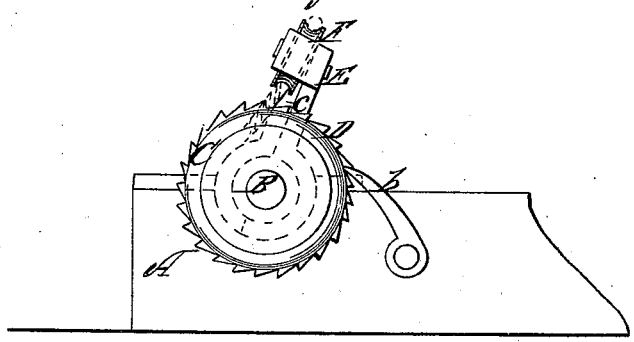
Figure 3:
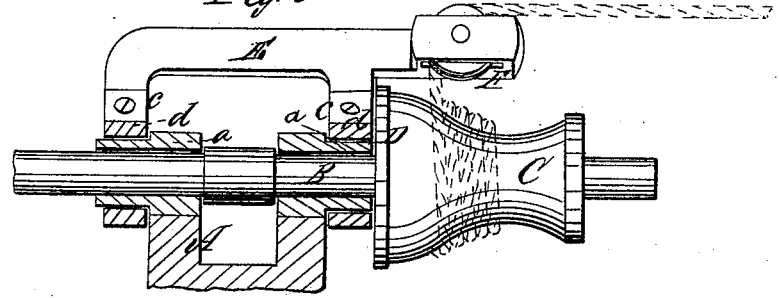

Figure 1, is a plan or top view of my improvement. Fig. 2, is an end view of ditto. Fig. 3, is a longitudinal section of the bearings of the shaft of the windlass.

Similar letters of reference indicate corresponding parts in the several figures.

The nature of my invention consists in the employment or use of a guide pulley attached to the windlass as will be presently shown and described, whereby the strain or bearing to which the pulley when in use is subjected is not transmitted to the shaft or any working part of the windlass, and the attachment rendered a permanent fixture without creating unnecessary friction or interfering in any way with the perfect operation of the windlass.

To enable others skilled in the art to fully understand and construct my invention I will proceed to describe it.

A, represents a proper framing or block on the upper part of which a shaft B runs in suitable bearings (*a*) (*a*).

C, represents a windlass head attached permanently to the shaft B, and having a ratchet D, attached to its inner end in which ratchet a pawl (*b*) attached to the framing or block A, catches, see Fig. 2. The bearings (*a*) (*a*) project a suitable distance beyond the sides of the framing or block A, and the projecting parts are of cylindrical form.

E, represents a frame to the outer end of which a pulley F, is attached. The frame E, is provided with two arms (*c*) (*c*) the lower or inner ends of which are provided with straps or eyes (*d*) (*d*) which encompass the projecting portions of the bearings (*a*) (*a*) as shown clearly in Fig. 3. The outer end of the frame E, projects over the head C, and is parallel with the shaft B, the pulley F, being a suitable distance from the periphery of the head. The straps or eyes (*d*) (*d*) turn on the projecting portions of the bearings (*a*) (*a*) and consequently the frame E, may be turned so that the pulley F, may be brought in any desired position relatively with the head C.

The pulley F, gives the proper direction to the rope or chain (shown in red) which is wound upon the head C, and permits articles to be hoisted which are not situated directly in front or back of the windlass. The rope or chain it will be seen must in all cases be wound upon the head in a direction at right angles with its shaft and thus when the article to be hoisted or raised is not directly in front or back of the windlass, a pulley must be used in order to guide or give the proper direction to the rope or chain as it is wound upon the head. Guide pulleys are now placed temporarily near a windlass, and taken down or removed when not required. Considerable time is expended in adjusting the pulleys, and as they are generally fitted up in a hurried manner they often answer but imperfectly the purpose intended. By my improvement the pulley is rendered a permanent fixture, and when in use no friction is created upon the shaft B, owing to the mode of attaching the frame E, to the framing or block A, and when the pulley is not required to be used the frame E, may be turned down upon the framing or block, and the frame and pulley will not be in the way or prevent in any degree the perfect operation of the windlass.

Having thus described my invention what I claim as new and desire to secure by Letters Patent, is—

The employment or use of the guide pulley F, attached to the frame E, the frame being connected to the framing or block A, substantially as herein shown and described for the purpose set forth.

W. N. GESNER.

Witnesses:
LYMAN WOODWARD,
WYLLYS HEMINGWAY.